G. T. FIELDING, Jr.
DISSOLVING VIEW DISPLAY APPARATUS.
APPLICATION FILED JAN. 28, 1911.

1,031,542.

Patented July 2, 1912.

3 SHEETS—SHEET 1.

WITNESSES

INVENTOR
George Thomas Fielding Jr.
BY
ATTORNEYS

G. T. FIELDING, Jr.
DISSOLVING VIEW DISPLAY APPARATUS.
APPLICATION FILED JAN. 28, 1911.
1,031,542.
Patented July 2, 1912.
3 SHEETS—SHEET 2.
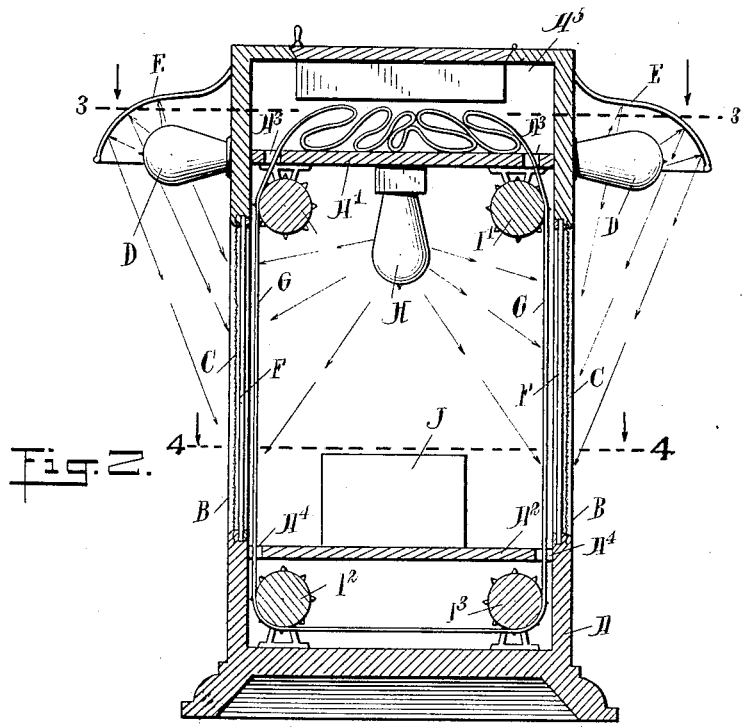
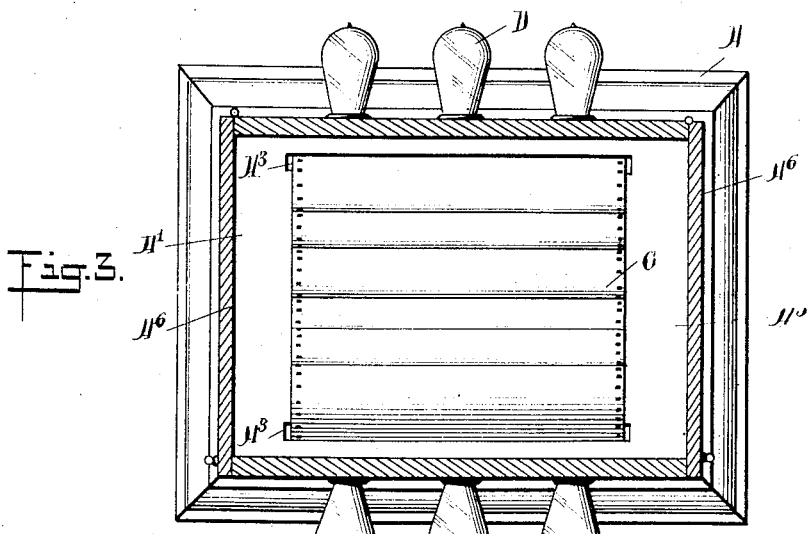
WITNESSES
INVENTOR
George Thomas Fielding Jr.
BY
ATTORNEYS G. T. FIELDING, Jr.
DISSOLVING VIEW DISPLAY APPARATUS.
APPLICATION FILED JAN. 28, 1911.

1,031,542.

Patented July 2, 1912.

3 SHEETS—SHEET 3.

WITNESSES

INVENTOR
George Thomas Fielding Jr.
BY
ATTORNEYS

UNITED STATES PATENT OFFICE.

GEORGE THOMAS FIELDING, JR., OF NEW YORK, N. Y.

DISSOLVING-VIEW DISPLAY APPARATUS.

1,031,542.   Specification of Letters Patent.   Patented July 2, 1912.

Application filed January 28, 1911. Serial No. 605,222.

*To all whom it may concern:*

Be it known that I, GEORGE THOMAS FIELDING, Jr., a citizen of the United States, and a resident of the city of New York, borough of Manhattan, in the county and State of New York, have invented a new and Improved Dissolving-View Display Apparatus, of which the following is a full, clear, and exact description.

The invention relates to electrically-controlled changeable exhibiting apparatus, and its object is to provide a new and improved dissolving view display apparatus, in which the display matter gradually appears and disappears to produce a highly interesting effect to the onlooker. For the purpose mentioned use is made of a casing provided with a screen and a transparent sign within the casing in the rear of the screen, two sources of light, one inside the casing and one exterior thereof for illuminating the said sign and the said screen, and means for gradually dimming one source of light while brightening the other and vice versa.

A practical embodiment of the invention is represented in the accompanying drawings forming a part of this specification, in which similar characters of reference indicate corresponding parts in all the views.

Figure 1:
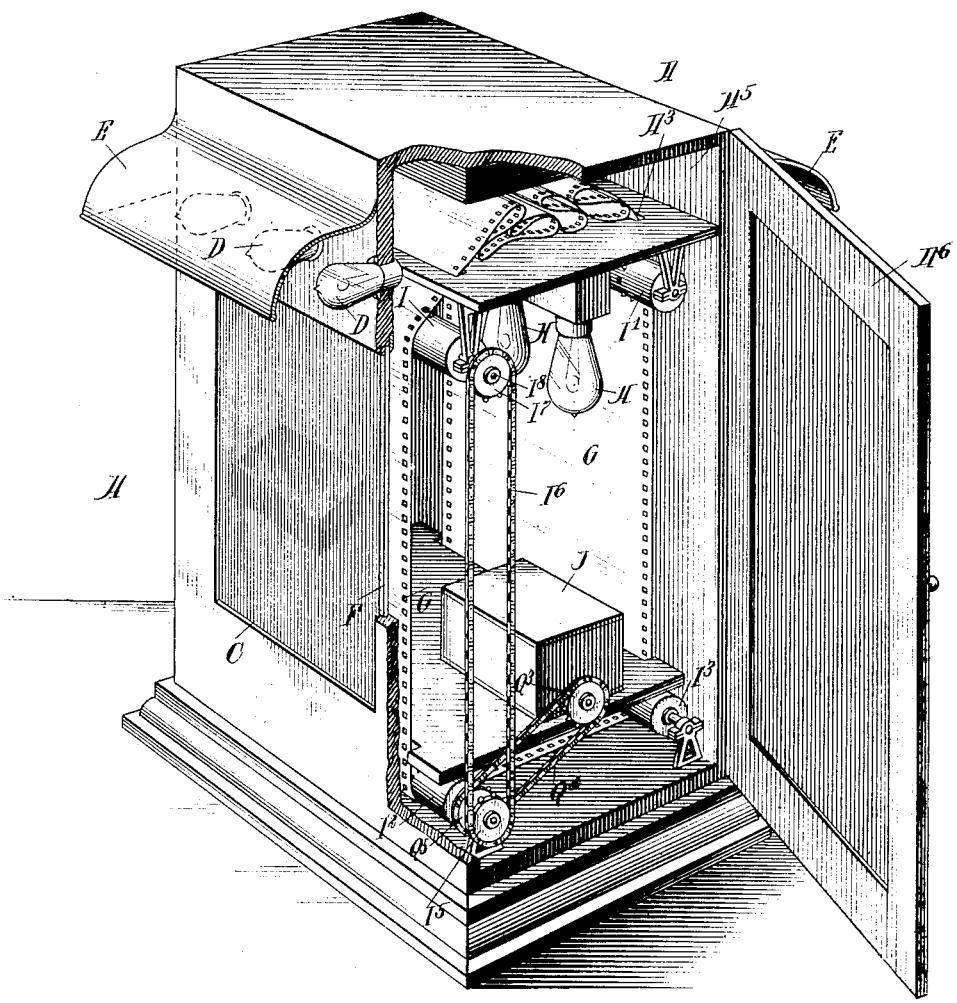
Figure 4:
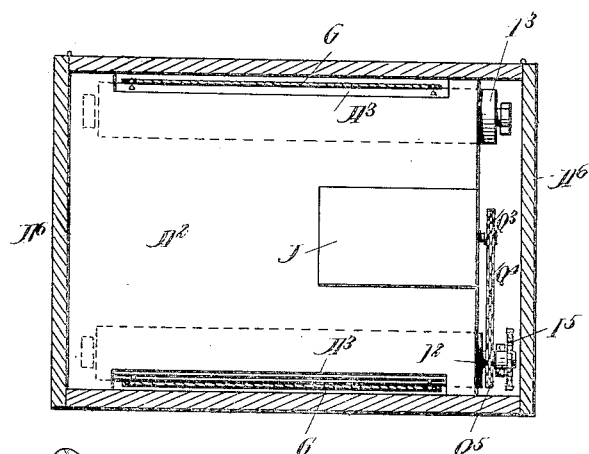
Figure 5:
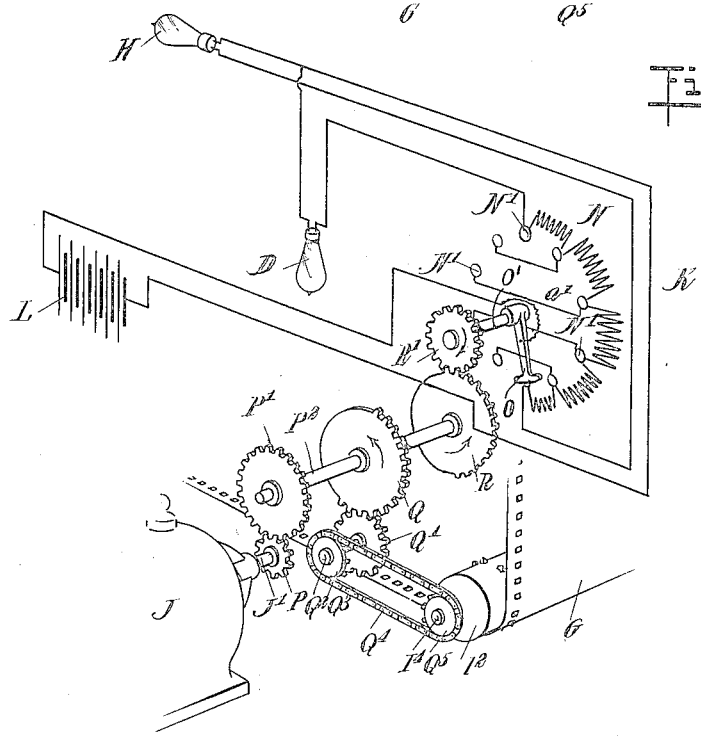

Figure 1 is a perspective view of the apparatus, showing the door of the casing open and part of the casing in section; Fig. 2 is a transverse section of the same; Fig. 3 is a sectional plan view of the same on the line 3—3 of Fig. 2; Fig. 4 is a like view of the same on the line 4—4 of Fig. 2; and Fig. 5 is a perspective view of the motor and driving mechanism for the endless sign and the means for operating the dimming device for the electric lamps used for illuminating purposes.

As shown in the drawings, a suitably constructed casing A is provided on opposite sides with openings B, each covered by a screen C adapted to be illuminated from the outside of the casing by a source of light, preferably in the form of electric lamps D attached to the corresponding side of the casing near the top thereof. Over each set of lamps D, at one side of the casing A, is arranged a reflector E secured to the casing and serving to throw the rays of light of the lamps D down onto the screen C at the outer face thereof. The screen C is preferably painted with a desired subject matter, for instance an empty cigar box, as indicated in Fig. 1.

In the rear of each of the screens C is arranged a plain screen F of translucent glass, white gauze, or the like, and in the rear of the screen F within the casing A is arranged a transparent sign G, which may be fixed but is preferably in the form of an endless transparent web provided with the matter to be displayed in conjunction with the article represented on the screen C. Thus the transparent sign G may be provided with a representation of cigars intended to appear in the empty cigar box. The transparent sign G is illuminated from within the casing A by a source of light, preferably in the form of electric lamps H, secured to a top partition $A'$ arranged in the casing A. The transparent sign G when in the form of an endless traveling web passes over rollers I, $I'$, $I^2$ and $I^3$ journaled in the casing A, the rollers I and $I'$ being preferably mounted on the under side of the partition $A'$ while the rollers $I^2$, $I^3$ are journaled in the bottom of the casing A. The rollers I and $I^2$ are disposed opposite each other at one side of the casing so that the sign G is stretched in close proximity to the screen F on one side of the casing, and the rollers $I'$ and $I^3$ are simultaneously disposed near the opposite side of the casing A to hold a portion of the sign G stretched in the rear of the screen F held at this side of the casing. A partition $A^2$ is arranged above the rollers $I^2$ and $I^3$ and supports a motor J for imparting an intermittent turning motion to the rollers $I^2$ and I by the means hereinafter more fully described.

The sets of electric lamps D and H are arranged in an electric circuit K, connected with a suitable source of electrical energy L, and in the said circuit K is arranged a resistance N having a number of contact points $N'$ adapted to be engaged by a contact arm O extending from a shaft $O'$ intermittently driven from the motor J. On the motor shaft $J'$ is secured a pinion P in mesh with a gear wheel $P'$ secured on a shaft $P^2$ provided with a mutilated gear wheel Q in mesh with a gear wheel $Q'$ secured on a shaft $Q^2$ carrying a sprocket wheel $Q^3$, around which passes a sprocket chain $Q^4$, also passing around a sprocket wheel $Q^5$ secured on the shaft $I^4$ of the roller $I^2$. The shaft $I^4$ of the roller $I^2$ is provided with a sprocket wheel I⁵ connected by a sprocket chain I⁶ with a sprocket wheel I⁷ secured on the shaft of the roller I, so that when the motor J is running an intermittent rotary motion is transmitted by the gearing described to the rollers I² and I, to impart an intermittent traveling motion to the endless transparent sign G. On the shaft P² is secured a mutilated wheel R in mesh with a gear wheel R' secured on the shaft O' carrying the contact arm O for the resistance N. and when the motor J is running the said arm O is intermittently swung around to make contact with the contact points N' of the resistance N. When the arm O is in the position shown in Fig. 5 the electric lamps H are burning brightly while the electric lamps D are dimmed to the utmost, and consequently the sign G is illuminated from the inside of the casing while the screen C is very dimly illuminated by the lamps D. Now as the arm O travels in the direction of the arrow a' the lamps H are gradually dimmed while the lamps D are gradually brightened, and when the arm O has made a half revolution the lamps D are burning brightly while the lamps H are dimmed to the utmost. When this takes place the screen C is illuminated by the rays of light from the lamps D while the sign G is very dimly illuminated from the lamps H, and during this time a traveling motion is given to the sign G by the transmitting mechanism connecting the motor J by way of the mutilated gear wheel Q with the driving mechanism for the rollers I² and I. During the next half revolution of the arm O the electric lamps D are gradually dimmed while the electric lamps H are brightened, and when the arm O has returned to the position shown in Fig. 5 the lamps H are burning brightly while the lamps D are dimmed to the utmost.

As shown in Fig. 2, the partitions A' and A² are provided with slots A³, A⁴ for the passage of the endless transparent sign G, which latter can fold in a chamber A⁵ arranged in the top of the casing A above the partition A'. The casing A is provided with suitable doors A⁶ at the ends, for gaining access to the interior of the casing and the parts contained therein, for repairs or other purposes.

By using the screen F intermediate the outer screen C and the sign G, it is possible to place the parts close together without danger of disclosing the display matter on the sign G at the time the lamps D are burning brightest and the lamps H are dimmed, and consequently the display matter on the sign G is not visible to the onlookers.

It is understood that when the apparatus is in use, an intermittent traveling motion is given to the sign G in such a manner that it is at rest during the time the lamps H are burning brightly while the lamps D are dimmed and the sign G is in motion at the time the lamps H are dimmed and the lamps D are burning brightly.

In case the screen C is provided with the representation of a cigar box, as previously mentioned, and the pictorial illustration on the sign G of cigars is in register with the box, then the effect is that while the lamps D are burning brightly the empty box is illuminated, and when the change in lighting takes place gradually the cigar box appears gradually dimmer while the cigars on the screen become visible and gradually brighten and the cigar box gradually disappears, until finally the cigars are visible only at the time the lights D are dim and the lights H are burning brightly. From the foregoing it will be seen that the two pictures gradually dissolve one into the other.

Having thus described my invention, I claim as new and desire to secure by Letters Patent:

1. A dissolving view display apparatus, comprising a casing provided with a display opening, a translucent screen extending over the opening, a transparent sign extending over the opening in the rear of the screen, exterior and interior sources of light for illuminating the screen and sign, the said screen and sign having coöperating display matter thereon, and means for gradually dimming one source of light while brightening the other.

2. A dissolving view display apparatus, comprising a casing provided with a display opening, a painted translucent screen extending over the said opening at the outside of the casing, a transparent sign across the opening at the inside of the casing, a plain translucent screen intermediate the said painted screen and the said transparent sign, exterior and interior sources of light for illuminating the painted screen and the said transparent sign, the said painted screen and transparent sign having display matter produced thereon and arranged to act in conjunction with each other, and means for gradually dimming one source of light while brightening the other.

3. A dissolving view display apparatus, comprising a casing provided with a display opening, a translucent screen extending over the said opening exterior of the casing, a transparent sign extending over the opening in the rear of the screen, exterior and interior sources of electric light for the said casing, controlling means for the sources of light having a revoluble contact arm for gradually dimming one source of light while brightening the other during each half revolution of said contact arm, and a motor for intermittently imparting a half revolution to said contact arm.

4. A dissolving view display apparatus, comprising a casing having a display opening, a translucent screen extending over the said opening exterior of the casing, an endless transparent sign mounted to travel in the said casing past the said opening at the inside of the casing, an exterior source of light in the form of electric lamps on the outside of the casing, a reflector on the casing over the said exterior source of light to throw the rays of light onto the said screen, an interior source of light in the form of electric lamps for illuminating the said transparent sign, an electric circuit for the said sets of electric lamps, a resistance in the said circuit and having a movable arm, a motor, and an intermittent actuating device for the said resistance arm and driven from the said motor for gradually dimming one source of light while brightening the other, and intermittent driving means for the said transparent sign and driven by the said motor, the said driving means moving the said endless sign when the interior source of light is dimmed.

5. A dissolving view display apparatus, comprising a casing having a display opening, a translucent screen extending over the said opening exterior of the casing, an endless transparent sign mounted to travel in the said casing past the said opening at the inside of the casing, an exterior source of light in the form of electric lamps on the outside of the casing, a reflector on the casing over the said exterior source of light to throw the rays of light onto the said screen, an interior source of light in the form of electric lamps for illuminating the said transparent sign, an electric circuit for the said sets of electric lamps, a resistance in the said circuit and having a movable arm, a motor, intermittent driving means for the said transparent sign and driven by the said motor, and an intermittent actuating device for the said resistance arm and driven from the said motor for gradually dimming one source of light while brightening the other, the said driving means and the said actuating device being driven alternately from the motor and the said driving means imparting motion to the said transparent sign when the interior source of light is dimmed.

6. In a dissolving view display apparatus, a movable transparent sign, a fixed translucent screen, the screen and sign having display matter thereon, a source of electric light for illuminating the movable sign, a source of electric light for illuminating the fixed screen, controlling means having a revoluble member adapted during each half revolution of said member to gradually dim one source of light while gradually brightening the other, a motor, means actuated from the motor for intermittently imparting a half-revolution to said revoluble member, the said revoluble member when at the end of one half-revolution dimming the source of light for said movable sign to the utmost, and when at the end of the other half-revolution causing said light to burn brightly, and means actuated from the motor for intermittently moving the said movable sign, the said movable sign and the said revoluble member being actuated alternately and the movable sign being at rest at the time the source of light for said sign is burning brightly.

7. In a dissolving view display apparatus, a movable transparent sign, a fixed translucent screen, the screen and sign having display matter thereon, sources of light for illuminating the said screen and sign respectively, a controlling means having a revoluble member, adapted during each half-revolution to gradually dim one source of light, while gradually brightening the other, a motor, and mechanism for actuating the said movable sign and the said revoluble member of the controlling means alternately from the motor, the said sign being actuated at the time the revoluble member has finished the half-revolution for dimming the source of light for said sign.

8. In a dissolving view display apparatus, a movable transparent sign, a fixed translucent screen, the screen and sign having display matter thereon, a source of electric light for illuminating the said movable sign, a second source of electric light for illuminating the said screen, an electric circuit in which both sources of light are arranged, a resistance in the said circuit and having a revoluble contact arm, a motor, intermittent driving means for the said movable sign and driven by the said motor, an intermittent actuating device for the contact arm, and driven from the said motor, the said actuating device during each intermittent operation imparting a half-revolution to the contact arm to gradually dim one source of light while brightening the other, one source of light at the end of each half-revolution of the contact arm being dimmed to the utmost while the other source of light is burning brightly, the said driving means and the said actuating means being driven alternately from the motor and the driving means for the movable sign being actuated at the time the contact arm is in position to dim to the utmost the source of light for illuminating said movable sign.

9. In a dissolving view display apparatus, the combination with a fixed translucent screen, an endless transparent sign, the screen and sign having display matter produced thereon, sources of light for illuminating said screen and sign respectively, and controlling means for gradually dimming one source of light while brightening the other, the controlling means having a movable member, of a motor, a shaft driven from the motor shaft and provided with mutilated gear wheels, mechanism driven from one of said mutilated gear wheels for imparting an intermittent traveling motion to said endless sign, and means actuated intermittently from the other mutilated gear wheel for moving the said movable member of the controlling means, the said endless sign and the said movable member of the controlling means being actuated alternately.

In testimony whereof I have signed my name to this specification in the presence of two subscribing witnesses.

GEORGE THOMAS FIELDING, Jr.

Witnesses:
 THEO. G. HOSTER,
 JOHN P. DAVIS.